(12) United States Patent
Kong et al.

(10) Patent No.: US 6,473,401 B1
(45) Date of Patent: Oct. 29, 2002

(54) SELF-SCALING METHOD FOR EXPLOITING CACHED RESOURCES ACROSS ORGANIZATIONAL BOUNDARIES TO ENHANCE USER RESPONSE TIME AND TO REDUCE SERVER AND NETWORK LOAD

(75) Inventors: Keith Kong, San Jose, CA (US); Dipak Ghosal, Irvine, CA (US)

(73) Assignee: iScale, Inc., Mountain View, CA (US)

( * ) Notice: Subject to any disclaimer, the term of this patent is extended or adjusted under 35 U.S.C. 154(b) by 0 days.

(21) Appl. No.: 09/286,490

(22) Filed: Apr. 5, 1999

Related U.S. Application Data

(60) Provisional application No. 60/080,907, filed on Apr. 6, 1998.

(51) Int. Cl.[7] .................................................. H04J 1/16
(52) U.S. Cl. ...................................... 370/229; 709/235
(58) Field of Search ................................. 709/213, 236, 709/226, 232, 205, 235; 370/230, 220, 226, 216; 395/200

(56) References Cited

U.S. PATENT DOCUMENTS

| | | | |
|---|---|---|---|
| 4,706,081 A | 11/1987 | Hart et al. ............. 340/825.03 |
| 5,355,453 A | 10/1994 | Row et al. .................. 395/200 |
| 5,392,400 A | 2/1995 | Berkowitz et al. .......... 395/200 |
| 5,408,465 A | 4/1995 | Gusella et al. .............. 370/229 |
| 5,604,867 A | 2/1997 | Harwood ............... 395/200.13 |
| 5,655,140 A | 8/1997 | Haddock ............... 395/200.76 |
| 5,708,659 A | 1/1998 | Rostoker et al. ............ 370/392 |
| 5,719,854 A | * | 2/1998 | Choudhury et al. ........ 370/231 |
| 5,748,901 A | | 5/1998 | Afek et al. ............. 395/200.68 |
| 5,935,205 A | * | 8/1999 | Murayama et al. ......... 709/216 |
| 6,240,461 B1 | * | 5/2001 | Cieslak et al. .............. 709/235 |
| 6,253,234 B1 | * | 6/2001 | Hunt et al. ................. 709/213 |
| 6,389,468 B1 | * | 5/2002 | Muller et al. ............... 709/226 |
| 2002/0041600 A1 | * | 4/2002 | Barri .......................... 370/413 |

* cited by examiner

Primary Examiner—Hassan Kizou
Assistant Examiner—Lu Yin
(74) Attorney, Agent, or Firm—Gray Cary Ware & Freidenrich LLP

(57) ABSTRACT

A system and method for avoiding internet congestion that employs a pseudo-serving mechanism that entails the use of a contract method of cooperatively sharing retained resources within the normal body of network requesters which thereby reduces the burden on heavily loaded servers and lowers both data congestion and expected user response times. Requesters, or their proxies, can elect to improve data access time by contracting for the data, whereby they warrant that they shall serve resources on a limited basis in exchange for speedier access to the data, the access to which is either granted directly, or through another pseudo-server. Congested servers thereby share their burden with the requesters constituting the burden, while requesting servers may exchange their unused bandwidth and memory resource for faster data access. Security features along with the fundamental incentives of the method allow for operation with variously uncooperative network servers. The system and method may be used with existing internet server resources and is scalable to any size network.

28 Claims, 4 Drawing Sheets

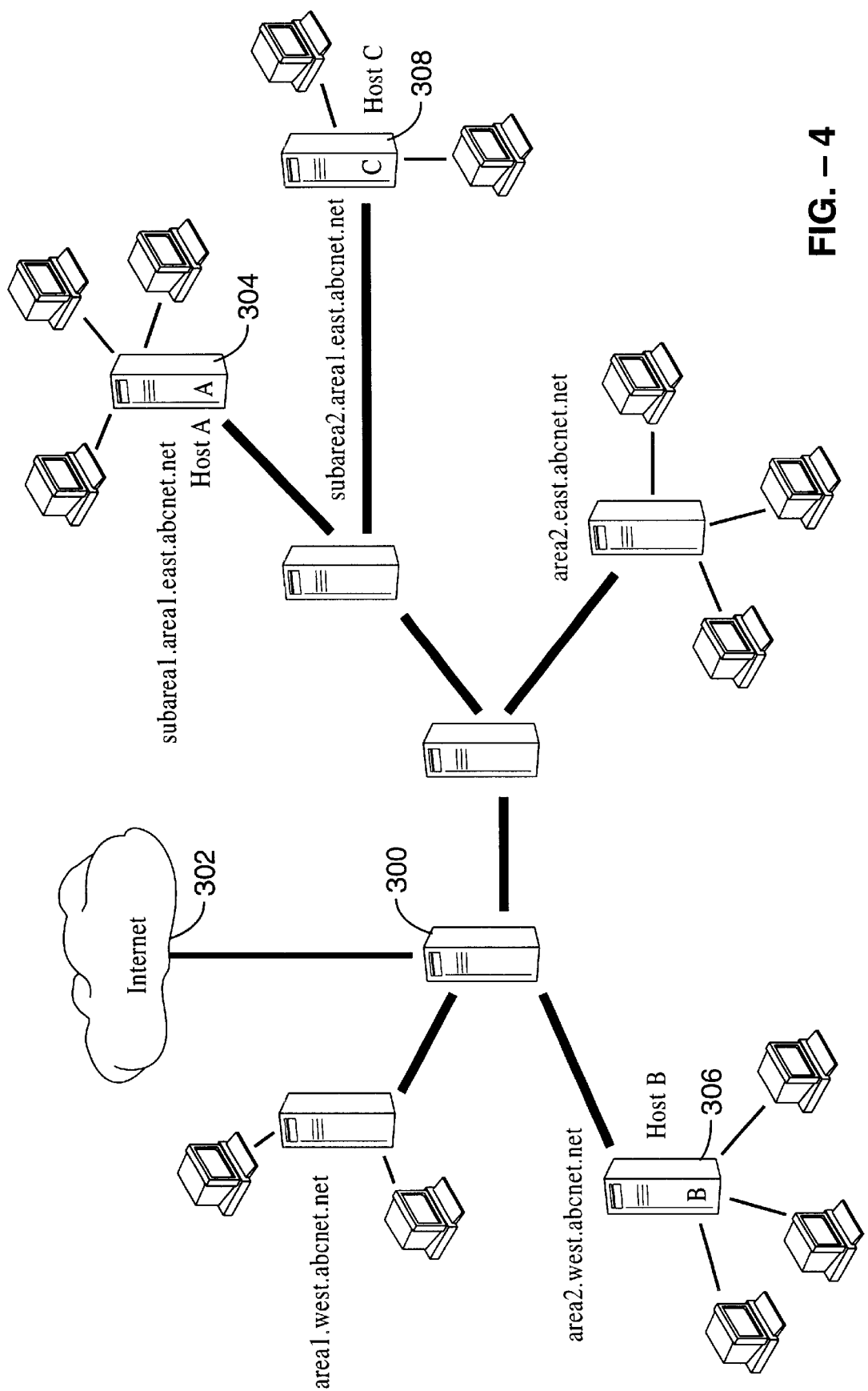
FIG. — 4

SELF-SCALING METHOD FOR EXPLOITING CACHED RESOURCES ACROSS ORGANIZATIONAL BOUNDARIES TO ENHANCE USER RESPONSE TIME AND TO REDUCE SERVER AND NETWORK LOAD

CROSS-REFERENCE TO RELATED APPLICATIONS

This application claims priority from copending U.S. provisional application serial No. 60/080,907 filed on Apr. 6, 1998, incorporated herein by reference.

STATEMENT REGARDING FEDERALLY SPONSORED RESEARCH OR DEVELOPMENT

Not Applicable

REFERENCE TO A MICROFICHE APPENDIX

A microfiche appendix is attached. The total number of microfiche is one and the total number of frames is ninety-two.

NOTICE OF MATERIAL SUBJECT TO COPYRIGHT PROTECTION

All of the material in this patent document is subject to copyright protection under the copyright laws of the United States and of other countries. The owner of the copyright has no objection to the facsimile reproduction by anyone of the patent document or the patent disclosure, as it appears in the United States Patent and Trademark Office file or records, but otherwise reserves all copyrights whatsoever.

BACKGROUND OF THE INVENTION

1. Field of the Invention

This invention pertains generally to network server technology, and more particularly to a pseudo-serving system and method for reducing congestion at the server or within the network itself. The pseudo-serving mechanisms of the invention provide a means of cooperatively sharing the burden of file serving within the body of Internet requesters. Contract based incentives and security features operate to persuade resource consumers to help serve resources in return for speedier data access.

2. Description of the Background Art

The phenomenal growth of interconnected computer networks such as the Internet has intensified the demand for bandwidth. A major cause of delays in computer networks is congestion which, in the context of data transmission, is conceptually similar to congestion on a freeway. Each data packet to be passed over the network can be likened to a vehicle that is heading to a destination. When too many data packets (cars) are heading to destinations that lie along the same internet segment (freeway), then these packets (cars) interfere with one another. This causes the speed of the traffic to slow down, and it takes longer for the data packets (cars) to reach their desired destinations.

Bandwidth congestion in a computer network occurs largely at three different locations within the network, which can be categorized as follows:

(a) Server-side (on-ramp)—The bandwidth of the server and its link to the Internet is divided among the clients downloading files from the server. While the user can cause tremendous data to flow, the server and/or its link to the Internet is a point of congestion;

(b) Intermediate links (sections of freeway)—Congestion arises in the intermediate nodes and links of the Internet because too many users are using the network at the same time and the user requests share a common node or link. For example, congestion occurs when a router can not route packets faster than they arrive; and (c) Client-side (off-ramp)—The bandwidth provided by the user's internet service provider (ISP) is shared among a large number of other users (user community). The greater the sharing, the less bandwidth each user receives.

To better meet the demand for bandwidth and reduce Internet congestion, the research community is responding with innovative approaches. One approach, for example, is the development of faster network components, including modems, switches, and transmission lines. Despite these improvements, however, new multimedia applications continue to demand ever-greater bandwidth. The transmission of real-time traffic such as is required for Internet phone and videoconferencing applications, as well as the download of large Moving Picture Experts Group (MPEG) files, is tolerable only under the best of network conditions.

Another approach is the development of new protocols that use bandwidth more efficiently. Examples include Compressed Serial Line Internet Protocol (CSLIP) and Low-Bandwidth X, which use compression techniques to reduce redundancy. Other protocols such as Hyper-Text Transfer Protocol version 1.1 (HTTP 1.1) and Transaction Transmission Control Protocol (TTCP) improve on current standards by removing overhead. Still others call for the removal of entire protocol layers. Work is underway, for example, to implement Transmission Control Protocol/Internet Protocol (TCP/IP) directly over a Synchronous Optical Network (SONET).

A further approach is the development of caching mechanisms within the Internet. These schemes work by recognizing that files are often requested more than once. By storing popular files locally, future requests for these files can be satisfied quickly without the need to retrieve them from the server.

Caching schemes are characterized along a number of dimensions. Two of the most important ones include the location of the cache and the degree of cooperation. Data transfers from a cache close to the client tend to be faster and demand fewer resources from the network. Cooperative caches generally have fewer cache misses than those that operate by themselves. Although caching schemes work well and are responsible for a portion of the reduction of bandwidth usage today, they are not always able to satisfy requests. This happens when the request is a first request for the data, and when the requested data in the cache has become "stale"; in either case, the data must be retrieved from the server. Moreover, cooperative caches that yield higher hit rates suffer from many of the same problems that they were intended to address. These include bottlenecks at certain "hot spots" (sometimes retrieving a file from a heavily loaded cache is slower than retrieving it directly from the server) and increased latencies because the cache is located many nodes ("hops") away from the client.

Closely related to caching is prefetching. Rather than keeping retrieved data locally on behalf of future requests, prefetching works by transferring data to the user prior to a user request. Mailing lists, network news, and so-called "push" technologies belong to this category; data is pushed from the server to the client in anticipation of future requests. Unfortunately, prefetching suffers from two important drawbacks. First, it is useless to the user if the file requested has not been prefetched. Second, it generates unnecessary traffic in the network whenever files are retrieved for which there was never a request. This further exacerbates congestion in the network without providing any benefits.

Still another approach utilizes basic principles of economics. It recognizes that bandwidth is a scarce resource and seeks ways to allocate it optimally. Work in this area is often concerned with maximizing the welfare of the user community. This is usually done by granting priority for the delivery of packets to users who value it more at the expense of those who value it less. To encourage the truthful revelation of user values, these schemes often institute some form of pricing based on usage of bandwidth. Mackie-Mason and Varian's "smart market" gives a flavor for how economics can be applied to the allocation of bandwidth. In it, packets are routed based on bids placed by users; packets with higher bids are routed with higher priority over ones with lower bids. While schemes like the smart market maximize the welfare of the user community, they tend to be impractical from a number of standpoints. Prioritizing packets based on bids, for example, requires that all routers cooperate. This requires significant changes to the well-entrenched IP protocol and is therefore difficult to implement. Moreover, pricing schemes based on usage often incur significant accounting costs, and basic questions such as who should be billed in various distributed connectionless environment, such as the Internet, are difficult to answer.

The development of faster network components and more efficient protocols act to directly reduce network congestion, while caching and prefetching schemes may act to reduce congestion, but are not always effective. For example, requests that do not "hit" the caches go directly to the server. With a cache hit rate of about 50%, even with cooperative caches roughly half of all requests still arrive at the server. These cache misses apply both to regular caches and to cooperative caches.

Therefore a need exists for a technology that improves the efficiency of existing internet server resources that can be easily implemented on the existing internet infrastructure and does not rely on the hit-or-miss nature of caching. The present invention satisfies that need, as well as others, and overcomes deficiencies in current approaches.

BRIEF SUMMARY OF THE INVENTION

The present invention pertains to a method for reducing server side and intermediate link congestion for those requests which are not intercepted by the caches in a cached data transmission system and which would otherwise arrive at the server. In general terms our method, which we refer to as "pseudo-serving", improves the efficiency of existing Internet server resources by the cooperative sharing of retained resources within the normal body of requesters.

In accordance with an aspect of the invention, pseudo-serving provides another solution to the bandwidth problem by combining concepts from both the caching approach and the economics approach. Pseudo-serving is fundamentally based on the observation that users in possession of popular files from a busy server are in possession of a valuable resource. If they can be convinced to share this resource, congestion near the server and at the intermediate links can be avoided, and the overall welfare of the user community would be enhanced. In the description herein the term "user" or "user request" infers the inclusion of "proxies" and "proxy requests" on behalf of a user. Pseudo-serving provides the necessary incentives for users to share files according to a "contract". In it, the server agrees to provide information on where the requested file may be immediately obtained. In exchange, the client agrees to "pay" by serving the retrieved file to a specified number of other users within a specified period of time. This payment is used to satisfy requests for this same data by other users.

In accordance with another aspect of the invention, a user participates in pseudo-serving by joining as a "pseudo-server" in a pseudo-serving system. A pseudo-serving system according to the present invention comprises two components: a super-server and a set of pseudo-servers. A pseudo-server can be hosted within a traditional server or within a user workstation that shares files. The super-server grants the pseudo-server access concessions to resources in exchange for some amount of network and storage resources through the contract. The super-server can grant access concessions to any resource over which it has control. In the usual case these resources are files, but the resource could comprise a program with data, or any alternate network resource for which a requester may desire access concessions. In determining what constitutes an acceptable exchange of services for access concessions, the network conditions are interpreted in regard to policy set by the system administrator. The amount of resources that must be must be given in return for an access concession may be zero under "low-demand" conditions, when the superserver functions as a concurrent server and the pseudo-servers function as clients. Under "high-demand" conditions, when the downloading files take a long time due to congestion in the network, it may be possible to improve the pseudo-server's access to the requested file in exchange for temporary usage of the pseudo-server's network and storage resources. Under these circumstances, and subject to the condition that the contract is met, the super-server gives the pseudo-server a list of referrals to where the requested data may be obtained.

In general, any network environment can employ the pseudo-serving method of sharing the burden of resource serving embodied in this inventive system and method. Pseudo-serving offers a number of advantages, including:

Self-scaling—In pseudo-serving, information consumers become information providers through a bartering system. Under this mechanism, resources are generated quickly and dynamically to meet demand;

End-to-end—A pseudo-server system assumes provision of an end-to-end service, such as that provided by today's Internet. No changes need to be made in the underlying network infrastructure for pseudo-serving to work effectively, although it can exploit additional network services to enhance performance. For example, future networks that provide topological information can be used by a pseudo-server system to make better referrals;

Central-control—The super-server controls the distribution of its information through referrals. Important control information is sent directly from the server to the client while bandwidth-intensive data is sent by the pseudo-servers. This is an important feature for information providers that want to distribute information to as large an audience as possible without sacrificing fine-grained control of access to their information. For example, using pseudo-serving, information providers can distribute bandwidth-intensive multimedia files to a much larger audience, at significantly reduced costs compared to existing schemes, while maintaining a fine-grained profile of the count of the number of users in actual possession of the files. This is in contrast to caching schemes, which hide client requests from the server;

Fault-tolerance—Pseudo-serving is robust due to the exponential nature by which the pool of pseudo-servers grows. Simulations show pseudo-serving to be effective even if 40% of the users breach their contracts;

Orthogonal to existing schemes—Pseudo-serving is orthogonal to existing schemes for reducing response time. With respect to the operation of caching schemes, for example, pseudo-serving plays the role of a "catch-all"; requests not intercepted by caches are serviced by pseudo-server systems;

Easy to deploy—The two components of the pseudo-server system, the super-server, and the pseudo-server can be easily deployed in today's Internet; and Reservation—To the extent that contracts are honored, pseudo-serving is a reservation scheme: requested files are guaranteed to reside in the referred pseudo-servers. This is in contrast to caching schemes, where effectiveness depends on the hit rate of the cache.

An object of the invention is to allow the user or a proxy working on behalf of the user to bypass certain types of congestion in the Internet with the goal of reducing the user's response time.

An object of the invention is to reduce network response times for users that cooperate with the pseudo-serving environment.

Another object the invention is to improve the utility of network resources by enticing information consumers to become information providers by means of a bartering system, whereby the serving of data resources can more effectively meet demand.

Another object the invention is to improve the end-to-end service accorded a user without a requisite need to make fundamental infrastructure changes to the underlying network over which the invention operates.

Another object the invention is to provide servers with an ability to control the distribution of information through a mechanism of referrals, whereby the server can decide whether the requested data is to be served directly or is to be served indirectly by a pseudo-server, and may influence the decision by the user through the use of the referral mechanism.

Another object the invention is to provide a mechanism that reduces the burden on congested servers that can operate despite abuses and noncompliance within the network community.

Another object the invention is to provide a mechanism that reduces the burden on congested servers that is interoperable with various existing schemes, such as caching, that reduce response times.

Another object the invention is to provide a mechanism that reduces the burden on congested servers that is easy to deploy on an existing network.

Another object the invention is to provide a mechanism that reduces the burden on congested servers that incorporates a reservation mechanism, whereby to the extent that contracts are honored, the requested files are guaranteed to reside in the referred pseudo-servers. The mechanism does not rely on a cache "hit rate" that is dependent on cache use and loss through periodic cache flushing.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 4 is a schematic topology diagram of a computer network of an ISP for implementation of the invention.

DETAILED DESCRIPTION OF THE INVENTION

Referring more specifically to the drawings, for illustrative purposes the present invention is embodied in the system and method described with reference to FIG. 1 through FIG. 4. It will be appreciated that the system may vary as to configuration and as to details of the components, and that the method may vary as to the steps and their sequence, without departing from the basic concepts as disclosed herein.

1. Overview of Architecture

Figure 1:
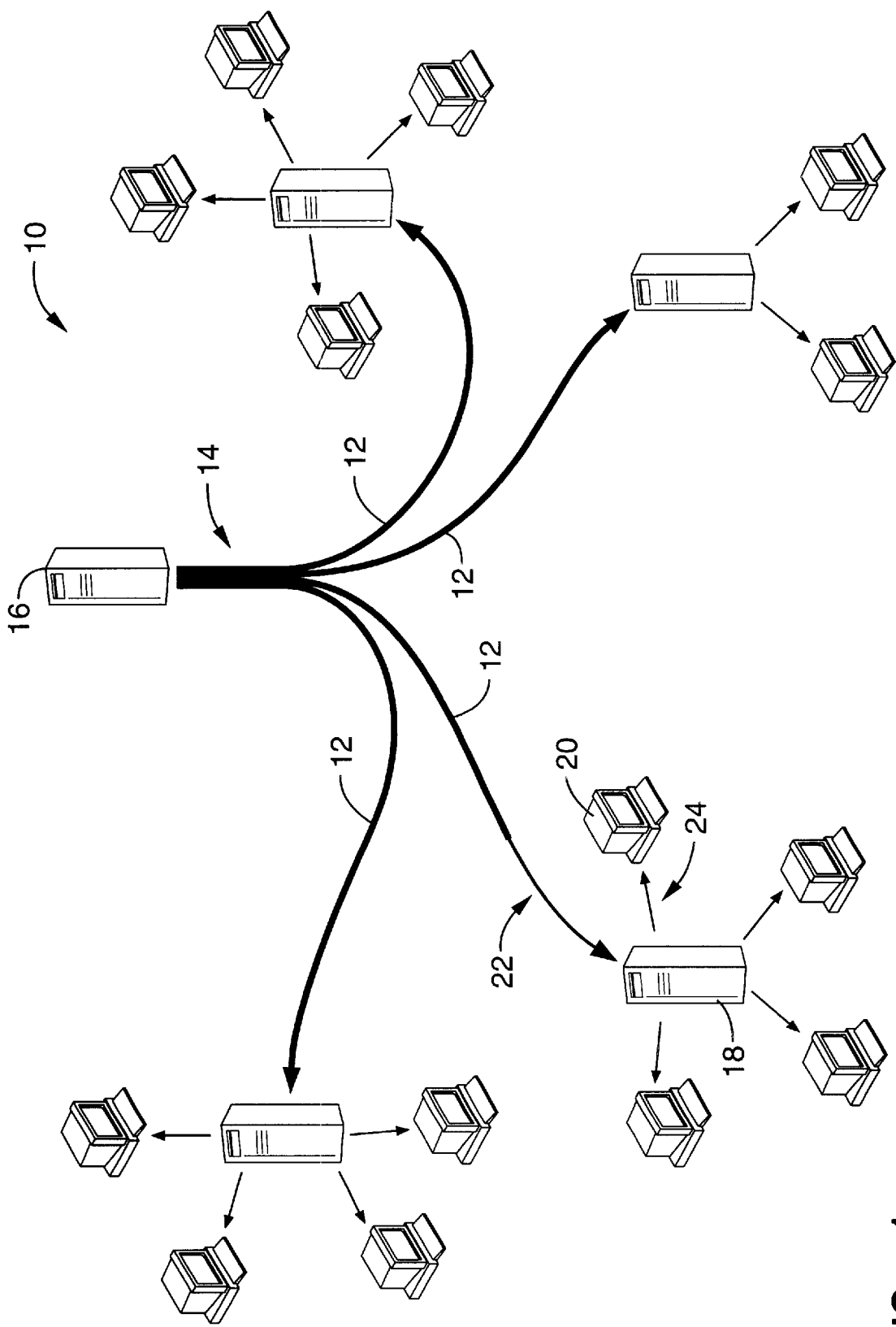
FIG. 1 is a schematic topology diagram of a computer network upon which the present invention may be implemented showing data flows and congestion between various servers and clients on the network.

FIG. 1 illustrates a representative network 10 that embodies the pseudo-serving methods and mechanisms of the current invention for reducing network congestion. The links 12 shown within the network of FIG. 1 are subject to congestion. The congestion can be considered in three general areas, as follows. First, server-side congestion 14, where the resource server 16 and its link to the Internet are divided among too many users 20 downloading files through proxy server 18. It will be appreciated that in most configurations, users 20 are directly connected to the internet without a proxy server. While the user 20 can cause tremendous data to flow, the resource server 16 and/or its Internet link is a point of congestion. Second, intermediate link congestion 22, where congestion arises in the intermediate nodes and links of the Internet because too many users 20 are using the network at the same time. For example, congestion occurs when a router can not route packets faster than they arrive. Lastly, client-side congestion 24, where congestion occurs when the bandwidth from an internet gateway or other endpoint is shared among a group of users 20. Often this occurs when the bandwidth associated with the user's internet service provider (ISP) connection is shared among a large number of other users. The greater the sharing, the less bandwidth each user receives. The widths of the black arrowed lines emanating from the resource server 16 depict relative bandwidth, with the narrower line segments corresponding to links with lower bandwidth.

The pseudo-serving system of the invention comprises two components: a super-server and a set of pseudo-servers. Any data request on the internet can be modeled as a user data request (or proxy/agent of user) that passes through one or more intermediate gateways or routers to a destination server containing the data sought. When a data network employs the pseudo-serving methods of the invention, the destination server can be considered a "super-server" and the clients that participate in the pseudo-serving system can be considered "pseudo-servers". The super-server grants the pseudo-server access to files (data resource) in exchange for some amount of network and storage resources. In temporarily contracting with the super-server to serve files, the client is accorded the term pseudo-server. The term "super-server" is in recognition of the hierarchical serving roles for any particular transaction. Any requester/client in the system provisioned for the inventive method may be considered a pseudo-server. A contract mechanism is employed between the super-server and pseudo-server to establish the terms of the exchange, wherein the pseudo-server exchanges a warrant that it shall temporarily serve files for the server in exchange for speedier data access sourced by the super-server or by referral to another pseudo-server.

When a super-server is serving a level of requests below its capability, a "low-demand" condition, the amount of network and storage resources that must be contracted for in exchange for the data may approach, or in fact be zero. Wherein the pseudo-server gets the data without making a warranty of any services in return. In the case of "low-demand" the super-server functions as a concurrent server and the pseudo-server functions as a client/requester intermediate server.

When a super-server is serving a level of requests at or near its capacity, a "high-demand" condition, the pseudo-server may be required to guarantee that it will supply resources to the super-server in exchange for the data resource that it is seeking on behalf of a remote user. During a "high-demand" period, the super-server has a greater number of requests for downloading data than it can timely fulfill. Yet by means of these contracts, the super-server is able to off-load a portion of its demand onto one or more pseudo-servers that enter into a contract to serve in exchange for data. Simply put, the pseudo-server is making the agreement: "I will work for speedier access to the data". The pseudo-server may get the data directly from the super-server if it agrees to retain the data locally for a specific amount of time, and to serve the data to other requesters. The super-server can then unburden itself of downloading this data to subsequent requesters by referring these requesters to the pseudo-server that has agreed to serve up that data. The subsequent requesters may also be required to enter into a contract in order to get a referral to the data. These resources being conveyed by subsequent requesters that enter into a contract can further act to reduce the demand on the super-server.

Policy set by the administrator of the super-server determines the conditions under which requestor/clients will be required to become pseudo-servers and serve a resource in exchange for access concessions. The policy set by the administrator may simply deny access to clients that do not agree to participate in pseudo-serving. Mechanisms within the policy administration software can allow for policy variations that further speed data and reduce client access times. These mechanisms can alter policy based on conditions that exist both at the super-server or that exist remotely in the network. For example, the policy administration software can take into account information received from network tracers, or bandwidth probes to modify the policy in order to reduce congestion on remote overcrowded network links. The policy may be modifed based on a time of day dependency whereby policy is altered based on expectations of "rush hour" traffic patterns. The preceeding description contains only a few examples out of numerous possibilities that exist whereby variables are taken into account by the software administering pseudo-server policy.

With the foregoing in mind, the following description will provide greater detail on: (1) communication via a pseudo-serving protocol; (2) behavior of the pseudo-serving system under operation; and (3) consideration of pseudo-serving system operation from a high-level view.

2. Pseudo-Serving Protocol

The pseudo-server, and the super-server exchange messages with each other and pseudo-servers also exchange messages amongst themselves. Messages and their arguments (shown in parenthesis) are displayed in BOLD and are described below. Their roles in the pseudo-serving system are described in the following sections.

The types of messages a pseudo-server can send are:
REQUEST_REFERRAL (file stndbyPort GSTBid NBid)—The pseudo-server wishes to obtain a list of referrals for file and is willing to serve NBid (Number Bid) users within GSTBid (Guaranteed Service Time Bid) seconds after it sends REQUEST_TO_SERVE. stndbyPort is the port number to which referrals should be directed on the pseudo-server's host should the contract be accepted.

REQUEST_TO_SERVE (file stndbyPort pckdRfrl GPHint EDT)—The pseudo-server, which can be identified by its IP address and stndbyPort, has received a referral for file and is ready to serve after a "grace period" of GPHint (Grace Period Hint) seconds. The picked referral is given by pckdRfrl, and an estimate of the time it takes for it to serve a referral is given by EDT (Estimated Download Time).

REPORT_BREACH (breacher)—The pseudo-server reports that the pseudo-server from which it chose to retrieve the file is either not serving the file or has served a modified copy of the file. Argument breacher corresponds to the alleged violator.

GET_FILE (file)—The pseudo-server sends this message to obtain the requested file from a pseudo-server serving the referral.

The types of messages the super-server can send are:
REJECT (reason GSTRequired NRequired)—The requester either has a bad reputation or needs to increase the resource bid, as specified by reason. If the resource bid needs to be increased, the amounts to which it should be increased is specified by GSTRequired (Guaranteed Service Time Required) and NRequired (N Required).

POOL_EMPTY(EAT)—The requester's resource bids are sufficient, but the super-server is currently unable to serve it. This happens because there are no pseudo-servers in the pool marked AVAILABLE (will be explained in the next section) and the super-server's concurrency limit has already been reached. EAT (Estimated Available Time) is sent to the requester as a hint to when pseudo-server may be expected to become available.

GET_DIRECT (GSTRequired NRequired)—The requester's resources bids are sufficient. Although there are no pseudo-servers in the pool marked AVAILABLE, the super-server's concurrency limit has not been reached and it is willing to serve the file directly to the requester. The requester actually needs to serve NRequired number of users within GSTRequired seconds.

GET_FROM (GSTRequired NRequired refrlList checksum)—The requester's resource bids are sufficient and the pool is not empty. The super-server gives the referral list, refrlList, to the pseudo-server and requires from it resources specified by GSTRequired and NRequired. Each member of refriList is a pair consisting of an IP address and a port number. To allow the requester to detect whether the file it retrieves from a pseudo-server has been modified, a cryptographic checksum (e.g. MD5) for the requested file, as given by checksum, is sent along with the referral list.

3. Operation of the Super-Server

The super-server's role in a pseudo-serving system is to process requests from pseudo-servers and to return responses as appropriate. There are three types of messages that may be received by a super-server from a pseudo-server. These messages, REQUEST_REFERRAL, REQUEST_TO_SERVE, and REPORT_BREACH are described in the following paragraphs. Note that the GET_FILE message is not sent to the super-server and so it does not handle them.

The REQUEST_REFERRAL message serves two purposes. The primary one is to allow a new pseudo-server to request a list of referrals from the super-server. A secondary purpose is to allow the requester to query for the terms of the contract. Under low to medium super-server demand situations, such queries are unnecessary because the requester's initial bid will be sufficient to meet the demands of the super-server.

In all cases in which the pseudo-server is served, its IP address and port number are recorded. This is necessary to correctly handle REQUEST_TO_SERVE messages.

The REQUEST_TO_SERVE message serves to notify the super-server which pseudo-server from the list of referrals has been chosen by the requester, and to give information to the super-server as to when the requester itself will become a pseudo-server and be ready to serve other requesters. Upon initial consideration, it may appear more natural for the requester to first receive the file in its entirety before it notifies the super-server that it is ready to serve; doing so would obviate the need for hints. Yet having the requester receive the file first would hinder the efficacy of the pseudo-serving system in a number of ways.

First, it would require that the TCP connection be open for a long period of time to send the REQUEST_REFERRAL message. The TCP connection would need to be open for sufficient time to allow the entire file to be retrieved before the REQUEST_TO_SERVE message could be sent. Alternately, a separate TCP connection could be used to send the REQUEST_TO_SERVE message, but this is also costly in terms of resource use.

Second, the time that transpires between the REQUEST_REFERRAL message and the REQUEST_TO_SERVE message corresponds to the duration that the members of the referral list are marked UNAVAILABLE. Lengthening this duration by the time it takes to retrieve the file lessens the resources that are available to serve other requesters. This has detrimental effects on the efficacy of a pseudo-serving system should the file retrieval time be long.

The REPORT_BREACH message allows pseudo-servers to report contract violators. The IP addresses of both the alleged violator and the pseudo-server reporting the incident are recorded. By accumulating such "incident reports," two pieces of information can be gathered. The first is the number of reports from unique pseudo-servers laying blame to a particular pseudo-server. The second is the number of reports each pseudo-server generates. Such information can be used by the administrator of the super-server to deny access to disreputable pseudo-servers or to mete another form of sanction.

In the preceding description, the communication mechanisms and functions underlying a preferred embodiment of the invention were described. In the following description these functions will be further described for the super-server and the pseudo-server in reference to flowcharts.

Figure 2:
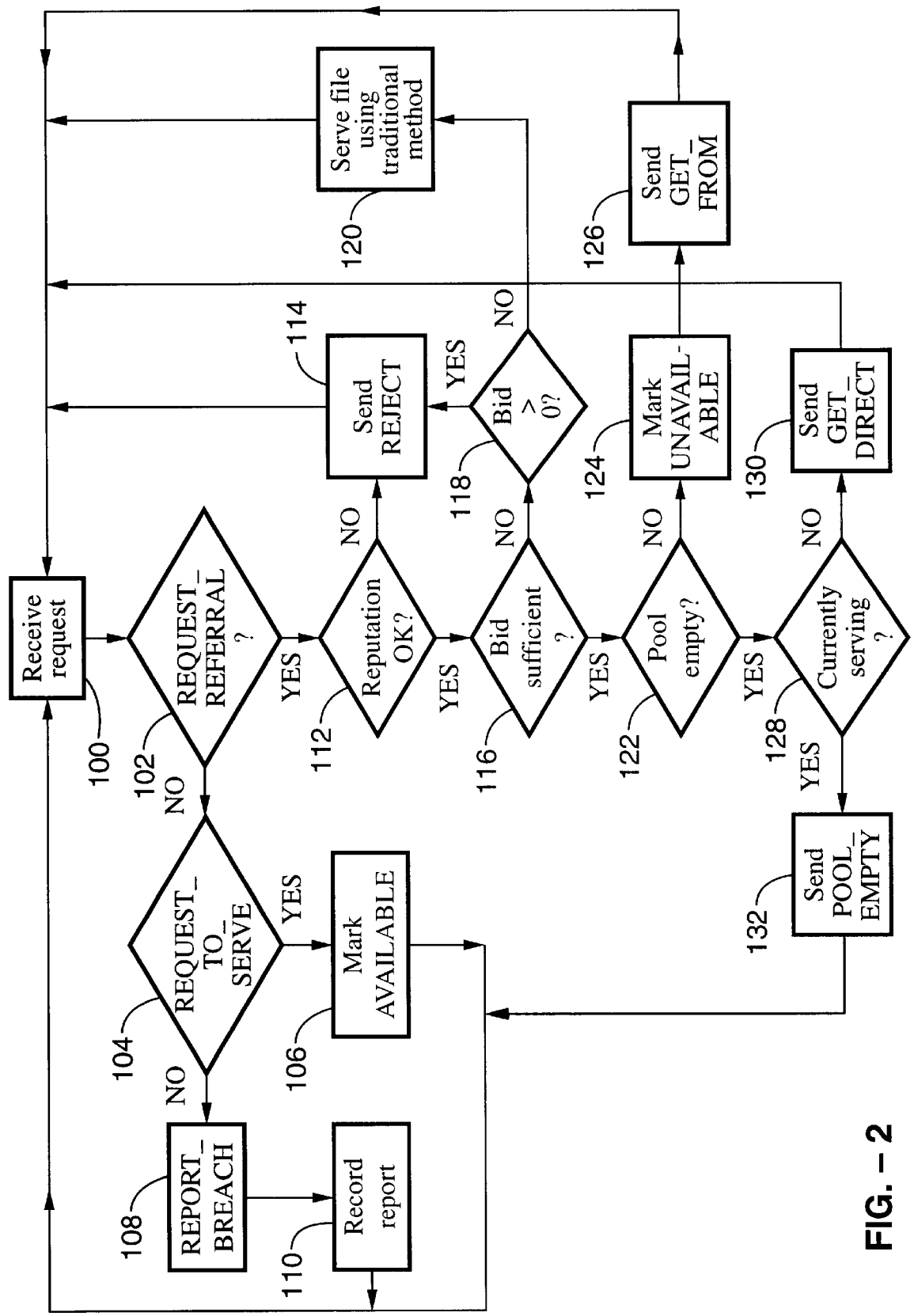
FIG. 2 is a flowchart showing request processing within the super-server of the present invention.

Program flow after receipt of a request by the super-server can be seen from the flowchart in FIG. 2. Upon receiving a request at step 100, the super-server checks to see if the message indicates that a pseudo-server wants a referral list of pseudo-servers (REQUEST_REFERRAL message) at step 102. If the message is not a referral request, then it is checked to see if the pseudo-server is volunteering (requesting) to be a pseudo-server (REQUEST_TO_SERVE message) at step 104. Generally, if the message is REQUEST_TO_SERVE, then the record entry corresponding to the pseudo-server posting this request is marked AVAILABLE at step 106 in a table on the super-server, and processing continues with the next request 100.

The process of marking the pseudo-server posting the REQUEST_TO_SERVE as AVAILABLE at step 106 involves checking to see if a record of the requesting pseudo-server exists, which is based on IP address and port number. If it does not exist, then the pseudo-server is ignored. If it exists, then the super-server marks the pseudo-servers not picked by the requesting pseudo-server using the pckdRfrl argument as being AVAILABLE again. It then checks to see if the pseudo-server picked by the requesting pseudo-server has satisfied its obligation. If so, it is removed from the pool. If not, it is rescheduled to be marked AVAILABLE again after some period of time. This period, as specified by EDT, is based on an estimate of the time it takes to transfer the file between the pseudo-server and the pseudo-server picked by it. Its purpose is to reduce the probability of pseudo-servers serving more than one referral simultaneously. Finally, the sender of the REQUEST_TO_SERVE message is added to the pool. It is initially marked as UNAVAILABLE and becomes AVAILABLE after a "grace period" as specified by the GPHint argument.

Returning to the top of the flowchart where a request is received at step 100, if the incoming request is not a REQUEST_REFERRAL message at step 102, and is found to not be a REQUEST_TO_SERVE at step 104, then a REPORT_BREACH is logged at step 108 and reported at step 110 followed by resumption of request processing at step 100.

If the request is found to be a REQUEST_REFERRAL at step 102, then it is checked to see if the requesters reputation is good at step 112. If the requesters reputation is not good, then a REJECT message is returned at step 114, with the reason argument set to BAD_REP followed by resumption of request processing 100.

If the requester is found to have a good reputation at step 112, then the bid of the requester is checked 116 to see if the resources that the requester is willing to contribute are sufficient to fulfill the contract. Sufficiency depends on the resource contributions as specified by GSTBid and NRequired. If either GSTBid or NRequired is greater than zero at step 118, then the super-server responds with a REJECT message at step 114, with the reason argument set to INC_RSRC and the GSTRequired and NRequired arguments set to values determined by the system administrator followed by resumption of request processing at step 100. If GSTBid and NRequired are found to both be zero at step 118, this signifies that the user does not wish to participate in pseudo-serving, therefore the file is sent to the user conventionally at step 120, followed by resumption of request processing at step 100. Sending a file conventionally may involve using a concurrent server with a fixed set of concurrencies. It should be noted that a pseudo-serving system operates conventionally under low-demand conditions until sufficient requests arrive to warrant the minor overhead involved with participating in pseudo-serving.

If the resources that the requester is willing to contribute are found to be sufficient at step 118, then the records of past pseudo-servers from a pool are examined to determine if any pseudo-server is available to serve the requester at step 122. If at least one exists, then a list is returned to the requester as the list of referrals. The length of this list is bounded by the number specified by the contract. These pseudo-servers are then recorded in a table indexed by the requester's address and port number and marked as being UNAVAILABLE at step 124. It should be noted that until the pseudo-server is marked AVAILABLE again, it can not be used for future requests. The sending of the referral list itself is accomplished by sending the GET_FROM message at step 126, with the refriList argument containing the list, and GSTRequired and NRequired arguments containing the actual resources required of the requester. Processing returns to receive another request at step 100.

If the pool of pseudo-servers was found empty at step 122 then no pseudo-server is available so the super-server activity is checked at step 128. If the super-server is found to not currently be serving another requester, then the super-server serves the request directly, notifying the requester of this by sending a GET_DIRECT message at step 130, with the GSTRequired and NRequired arguments playing the same role as those of the GET_FROM message. Processing then returns to receive another request.

If the super-server is found to be currently serving another requester at step 128, then a POOL_EMPTY message is sent to the requester at step 132, whereby processing returns to receive another request 100. The super-server has no referrals in the pool to pass to the requester and is itself unable to fulfill the request as it has reached its concurrency limit. Therefore the requester is given an estimated time when access may be available.

4. Operation of the Pseudo-Server

The corresponding role of the pseudo-server in a pseudo-serving system according to the invention is to query the super-server for the conditions of the contract, to request the referral list should the contract be feasible, to choose from this list the appropriate pseudo-server from which to retrieve the file, to retrieve the file, to satisfy its obligations to the contract, and to report contract violators. The pseudo-server performs these duties using the messages REQUEST_REFERRAL, GET_FILE, REQUEST_TO_SERVE, and REPORT_BREACH.

Figure 3:
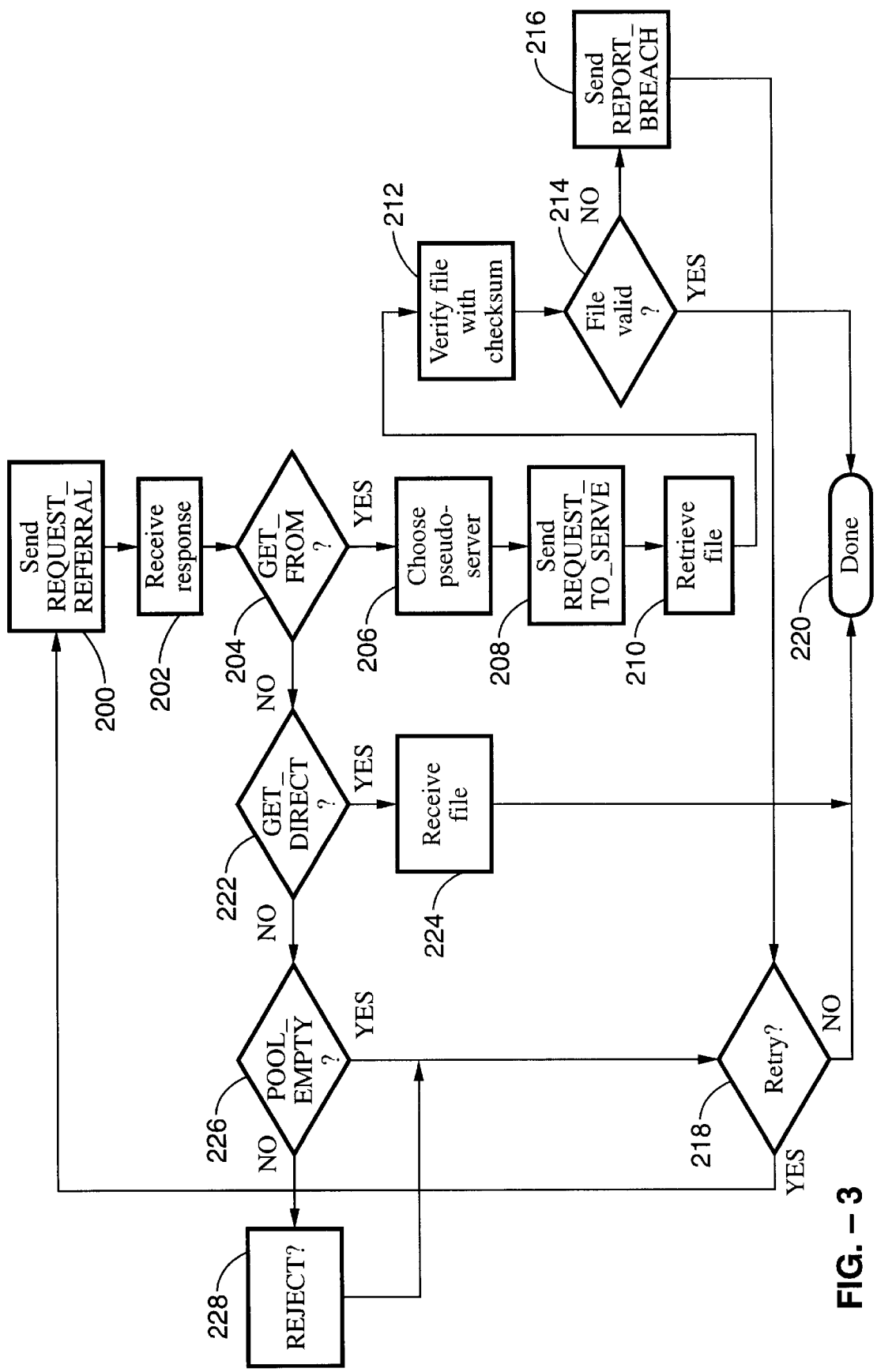
FIG. 3 is a flowchart of request processing within the pseudo-server of the present invention.

Referring to FIG. 3, we now describe program flow upon the pseudo-server sending a REQUEST_REFERRAL. The pseudo-server sends a request for a referral at step 200 (REQUEST_REFERRAL) to the super-server. A response is received at step 202 and checked to determine if it includes a referral in the form of a GET_FROM message at step 204.

More particularly, when the pseudo-server queries for contract conditions by sending REQUEST_REFERRAL at step 200 it sends the message with the GSTBid and NBid arguments set to "−1". This forces the super-server to return the required resources in the REJECT message as described for the super-server. To request the referral list, the pseudo-server again sends REQUEST_REFERRAL. If the response is a REJECT, the pseudo-server can resend the request at a later time when the contract is more favorable, or it can resend the request immediately with resource bids increased to at least GSTRequired and NRequired.

If the response received at step 202 from the REQUEST_REFERRAL sent at step 200 is found to be a GET_FROM message at step 204, then the super-server has returned a list of referrals. The pseudo-server must choose a pseudo-server from this referral list from whom it will retrieve the file at step 206.

One method by which the pseudo-server can use to choose a pseudo-server is by the use of bandwidth probes. In particular, the pseudo-server sends a sequence of five "pings" to each of the members of that list simultaneously. It then calculates the average value of the five pings corresponding to each member and chooses the member associated with the smallest average value (the member chosen will henceforth be called the "chosen pseudo-server.").

After choosing a pseudo-server from which to get the data, the pseudo-server sends a REQUEST_TO_SERVE message at step 208 back to the super-server, with the file specifier "file" set to the file it is requesting, stndbyPort set to the port number that it uses in awaiting for new requests directed to it by the super-server, pckedRfrl set to the member of the referral list that it picked, and GPHint and EDT set to an estimate of the time it will take for it to retrieve the file (based on some table). It should be noted that these estimates could be set to small values if the pseudo-server is equipped with the ability to serve a file that it is still receiving. The pseudo-server is now in the position to retrieve the file from the chosen pseudo-server.

The pseudo-server now retrieves the file from the chosen pseudo-server at step 210. This is accomplished by sending a GET_FILE message to that pseudo-server, with file set to the file that it is requesting. The response file from the chosen pseudo-server is checked against the checksum provided by the super-server at step 212. File validity is then checked at step 214. If the chosen pseudo-server has not sent a valid file, or if it sends a corrupt version of that file, then the pseudo-server reports the incident by sending a REPORT_BREACH message at step 216 to the super-server, with the breacher argument set to the identity of the chosen pseudo-server. A decision is then made as to whether to retry the request at step 218. If retried, then another request for referral (REQUEST_REFERRAL) is sent to the super-server at step 200; otherwise processing is complete at step 220. If the file validity check at step 214 is found to be valid, then the data can be passed on and processing of request is complete at step 220.

The REPORT_BREACH message is sent at step 216 to allow pseudo-servers to report contract violators. The IP addresses of both the alleged violator and the pseudo-server reporting the incident are recorded. By accumulating such "incident reports," two pieces of information can be gathered. The first is the number of reports from unique pseudo-servers laying blame to a particular pseudo-server. The second is the number of reports each pseudo-server generates. Such information can be used by the administrator of the super-server to deny access to disreputable pseudo-servers or to mete some other form of punishment.

If the response received at step 202 sent from the REQUEST_REFERRAL at step 200 is not found to be a referral list (GET_FROM message) at step 204, then the super-server response is checked to see if the server is allowing the pseudo-server to get the file directly (GET_DIRECT message) at step 222. If it is a GET_DIRECT message, then the pseudo-server proceeds with receiving the file from the super-server at step 224, with the actual resources required found in GSTRequired and NRequired. These parameters are sent along with the GET_DIRECT message because they may specify requirements for resources that are less than what the pseudo-server actually offered in making the request. When the file has been received, then request processing is complete at step 220.

If the response received at step 202 sent from the REQUEST_REFERRAL at step 200 is not found to be a referral list (GET_FROM message) at step 204 or an allowance to get the file directly (GET_DIRECT message) at step 222, then the message is checked to see if the super-server is telling the pseudo-server that no referral sources are available (POOL_EMPTY message) at step 226. If the message is POOL_EMPTY, the pseudo-server needs to wait for at least EAT seconds, as specified in the message, before resending the request and then may retry request at step 218.

If the message from the super-server is not GET_FROM, GET_DIRECT, or POOL_EMPTY then it may be an invalid message and can be rejected at step 228. The request for a referral can subsequently be retried at step 218. Although the basic operation of the pseudo-serving system of the present invention is as described above, the overall behavior of the pseudo-serving system is determined largely by the contract policy set forth by the super-server. In general, policies that require larger NRequired and GSTRequired lead to a faster creation of pseudo-servers and an existence of a greater number of them in the steady state. The following discussion assumes a specific policy in which each pseudo-server is required to serve NRequired other pseudo-servers within GSTRequired seconds. It is understood that the pseudo-server has fulfilled its obligation should less than NRequired clients be directed to the pseudo-server within GSTRequired seconds.

Under these assumptions, the behavior of the pseudo-serving system can be explained as a sequence of two phases, a "growth" phase and a "steady-state" phase. In the growth phase, the rate of requests exceeds the rate at which they can be satisfied by the pseudo-serving system. To meet demand, pseudo-servers are created until sufficient numbers exist to satisfy new requests as they come. When this point is reached, the pool of pseudo-servers stops growing and enters the steady-state phase. The following paragraphs describe these processes in greater detail. For simplicity, the following assumptions are made: (1) a constant stream of requests arrives at the super-server; (2) the size of the list of referrals is set to one and the EDT parameter is set to zero; and (3) GPHint corresponds accurately to the actual time it takes to download the requested file. In the growth phase, the number of pseudo-servers grows exponentially, at a rate of GSTRequired$^{time/GPHint}$. This growth can be understood as follows. Consider the first request that arrives at the super-server. After GPHint seconds, the pseudo-server that made the request becomes available to serve NRequired newly arriving pseudo-servers. After another GPHint seconds, this pseudo-server has finished serving the files, and thus has fulfilled its obligation and leaves the pool. At that moment, the NRequired pseudo-servers take its place, each ready to serve NRequired newly arriving pseudo-servers. In this way, the number of pseudo-servers actively serving requests directed to them, corresponding to the size of the serving pool, grows exponentially with time.

A key point to note concerns the limit of this exponential growth. Clearly, the number of pseudo-servers can not grow faster than the rate at which requests arrive. The exponential growth is sustained so long as the rate at which requests arrive exceeds the rate at which they can be satisfied by the serving pool. When this condition no longer holds, the serving pool "saturates" and stops growing. This size can be simply derived by equating the rate at which requests can be satisfied by the serving pool (size of pool×1/GPHint) and the rate at which requests arrive. Under this condition, the size of the pool is simply the product of GPHInt and the rate of request arrivals. Beyond this point, new pseudo-servers are generated to which no requests are redirected. These new pseudo-servers accumulate to form the "standby" pool. The size of this pool corresponds to the number of pseudo-servers available to serve a new request when it arrives at the super-server. The standby pool grows until the pseudo-serving system enters the steady-state phase, at which point the standby pool also stops growing. This is a manifestation of the finite time that clients are obligated to act in their capacity as pseudo-servers, as specified by the GSTRequired parameter. The size of the standby pool at this point is conveniently specified by Little's Law. In particular, the size is simply the product of the rate at which pseudo-servers join the pool and the length of time each stays in it as specified by GSTRequired.

The behavior of the pseudo-serving system just described has implications for how the parameters of the system should be set. In particular, when the rate at which requests arrive exceeds the rate at which they can be satisfied, NRequired should be set to a value greater than one in order for the pseudo-serving system to enter the growth phase. Experiments show that setting NRequired to two and GSTRequired to several seconds is sufficient. When enough resources are generated so that the pseudo-serving system enters the steady-state phase, NRequired can be reduced. GSTRequired, however, should be increased so that the super-server can give more than one referral to each requester. The amount by which GSTRequired should be increased is under the control of the system administrator. Setting a larger GSTRequired increases the size of the referral list; but makes it more difficult for pseudo-servers to satisfy the contract. The system administrator should take these considerations into account in setting GSTRequired.

Accordingly, it will be seen that this invention provides a general system and method for increasing the efficiency of network utilization through its creation and use of pseudo-servers. The pseudo-serving system and methods of the invention described can be modified in a number of ways, utilizing various protocols and innumerable coding structures. A few of these possible modifications are of particular interest, these include: designing World Wide Web (WWW) sites for suitability with pseudo-serving, an alternate mechanism for making referrals, and altering the scope of pseudo-serving in serving resources. The following describes each of these examples.

When designing WWW sites for suitability it must be remembered that Pseudo-serving is most effective when requests are for a small set of large files. Pseudo-serving reaches its limit of usefulness when the size of the referral exceeds the size of the file. To amortize the cost of referrals, it makes sense to collect small files into "packages". This packaging of files can be performed by means of a file compaction and collection utility; for example on UNIX systems the "tar" command may be used, and in a Windows environment various utilities such as "WinZip" program can perform packaging. While packaging does not reduce the number of requests to the superserver, the requests are made for a smaller number of entities. Hence, the rate of request of each individual entity is thereby increased. Specifically, if the rate of request for file $f_1, f_2, \ldots, f_n$ is $r_1, r_2, \ldots, r_n$, respectively, then the rate of request for a package consisting of $f_1, f_2, \ldots, f_n$ is $$f_n \text{ is } \sum_{i=1}^{n} r_i.$$

This, in turn, reduces GSTRequired for a given size for the standby pool desired by the system administrator (recall that the size of the standby pool is the product of the rate at which pseudo-servers join the pool and GSTRequired) and hence allows contract satisfaction by a greater number of pseudo-servers. It should be noted that while packaging increases the size of the object retrieved, it does not necessarily increase the perceived time for downloading the particular user requested file. When files are ordered within a package so that the requested file is ordered first, an intelligent packaging system can hide a large portion of the perceived delay. Of course, this assumes that once the requested file has been received, the user is viewing it or otherwise using it in some other manner and not waiting to download additional files.

The pseudo-serving system may also be modified in the manner in which referrals are made. Clearly, the benefit that the requester receives in participating in a pseudo-serving system depends on the referrals. Referrals would not be very useful, for example, if the requester and the pseudo-server were separated by highly congested transoceanic links. Fortunately, this problem is mitigated tremendously by giving each requester a list of referrals and letting the requester choose dynamically. The requester is then free to use any manner desired to anticipate which referral will give the fastest response time. Although the above description will serve a variety of network situations, additional software may be added to improve the sending of these referrals. One such improvement is described in the following paragraphs.

To complement the dynamic method for choosing the best referral, an addressing scheme based on a type of hierarchical address, henceforth called the NG-address (Network and Geographic), is introduced. The scheme identifies the location of the pseudo-servers both in terms of network topology and in terms of geography. The pseudo-server sends its NG-address along with each REQUEST_REFERRAL message. The super-server, in turn, returns a list of referrals that are closest to each requester's NG-address according to some metric to be defined later. An NG-address has two parts: the network part, or the N-address, and the geographic part, or the G-address. Each has the same syntax and semantics similar to that of Internet domain names. The fields are separated by periods, and the level of each field is determined by its relative location; fields closer to the right correspond to higher level domains, with the right-most field corresponding to the highest level domain. Unlike Internet domain names, N-addresses and G-addresses have specific restrictions. In particular, N-addresses have the restriction that its right-most fields correspond to the ISP's Internet Domain Name. G-addresses have the restriction that each field must be a member of a set. The set used is determined by the relative location of the field, and the sets themselves are predefined by an authority. A flag is then set indicating whether the network address or the geographic address was computed. The level of matching between two NG-addresses, addrNG1 and addrNG2, is computed as follows: First, define the following helper function:

Function compute_total_matched_fields(addr1, addr2)
IF (number of fields in addr1<=number of fields in addr2)
THEN Set a1=addr1 and set a2=addr2
ELSE Set a1=addr2 and set a2=addr1
Set matched_fields=0
For each f1 of a1, starting from the right-most field and working to the left-most field:
Extract f2 from the right-most field from a2
IF (f1 equals f2), THEN increase matched_fields by one
ELSE return matched_fields
Next, perform the following:
Set addrN1=network part of addrNG1
Set addrN2=network part of addrNG2
Set addrG1=geographic part of addrNG1
Set addrG2=geographic part of addrNG2
Set matches_for_addrN=compute_total_matched_fields(addrn1, addrN2)
IF (matches_for_addrN>0)
THEN level of matching is matches_for_addrN and type of matching is "network"
ELSE total level of matching is compute_total_matched_fields(addrG1, addrG2) and type of matching is "geographic"

The N-address is in tended to reflect the hierarchical nature of the network topology of most ISP's. While the only requirement of N-addresses is that the right-most fields correspond to the Internet domain of the ISP, it would be beneficial for the ISP for their proxy pseudo-servers to send N-addresses with fields structured in a way that reflect the topology of its network. This is so for the following reason. The super-server sends to the pseudo-server a list of referrals with the highest level of matching. A subset of this list may in fact correspond to pseudo-servers belonging to the ISP. To exploit network locality, under such circumstances the ISP should structure N-addresses so that the requester can easily infer from the N-addresses of this subset and its own N-address which pseudo-server is closest to it.

An example is now considered of a fictitious ISP with an Internet domain name of "abcnet.net", whose network topology is in the form of the tree structure depicted in FIG. 4. The root of this tree corresponds to the router 300 that connects the ISP to the is Internet 302 and the leaf nodes of the tree correspond to user machines connected to proxy pseudo-servers.

By structuring its N-addresses as illustrated, "abcnet" can take advantage of network locality to reduce traffic within its own network. Assume that "Host A" 304 and "Host B" 306 are pseudo-servers for "file f". Assume further that Host A 304 has a network address of "subarea1.area1.east.abcnet.net", Host B has an address of "area2.west.abcnet.net", Host C has an address of "subarea2.area1.east.abcnet.net" and that a multitude of additional network addresses exist, including "area2.east.abcnet.net" and "area1.west.abcnet.net". Host C 308 later makes a request for "file f", and is returned the following list of referrals:

subarea1.area1.east.abcnet.net
area2.west.abcnet.net
"newyork.ny.us".

As the level of matching between Host C 308 and Host A 304 is greatest among all members of this list, Host A 304 retrieves "file f" from Host C 308. If "abcnet" structures its N-addresses differently, it is possible that Host C 308 retrieves "file f" from Host B 306 instead of Host C 308. In doing so, additional links would be required in order to carry the traffic within the ISP's network.

The foregoing discussion focused on the use of N-addresses which is important for large ISP's whose pseudo-servers are likely to contain files requested from another pseudo-server within its own network. The use of N-addresses though, does not help in exploiting network locality for referral lists whose members are all from different ISP's. Therefore G-addresses are used as a fallback whenever N-addresses cannot, or are not, used as shown by the pseudo-code for computing level of matching.

G-addresses are based on an hierarchy of geographic codes. For illustration purposes, the codes used correspond to a geographic hierarchy such as, continent, country, state/province. Additional levels or variations of these could be easily be defined in a specification, so that any nature of hierarchy or level of specificity could be supported. Associated with each level of hierarchy is a set of names defined by a specifying authority. While these sets have yet to be defined, a simple to understand mechanism would perhaps bear some likeness to the name of the region. For example, a pseudo-server located at Davis, Calif., USA might have a G-address of davis.ca.us.na, where na stands for North America.

As can be seen, therefore, the present invention provides explicit incentives for distinct, not necessarily cooperative, organizational entities to share cached Internet resources, in the form set forth by the "pseudo-serving contract" wherein a user or a user's proxy obtains a list of sites from which the requested resource can be retrieved in exchange for serving at most N other users or their proxies within T seconds of retrieving the resource. A pool of pseudo-servers may form that have been given a resource either directly or through a referral. The pool of pseudo-servers for any resource builds when a high-level of demand exists for that resource and super-server policy persuades subsequent resource requesters to additionally serve the requested resource. The pool of pseudo-servers for any resource depletes as the level of demand wanes and pseudo-servers having fulfilled their contract to serve the resource are dropped from the pool. In addition, the reputation system provides disincentives for pseudo-servers to breach the agreed-upon pseudo-serving contract, as incorporated in the pseudo-serving protocol described herein.

Note also that the scope of the resources that can be served under the pseudo-serving system may be expanded. Pseudo-serving has thus far been presented in detail as a mechanism that allows users to enhance their access to static files. Yet, the pseudo-serving method described can be expanded and applied generally, beyond that of simply serving static files. For example, consider the provisioning of a service by a traditional server to a client. The server takes input from the client and returns an output based on the input and the data that the server contains. The mapping of input data to output data is controlled by a program. When the server runs this program, dynamic content is generated according to the input that was provided and this tailored output is then sent to the requester. With these observations in mind, the pseudo-serving system and methods of the present invention apply naturally to dynamic content; namely, the super-server sends the requester a list of referrals to where the resource can be obtained if the requester agrees to serve the received resource to N users within T seconds. An important point to note here is that the resource is the aforementioned data plus a program. Rather than just serving a package of data, the program is to run on the requester's machine to provide dynamic content to unburden the super-server. Clearly, this method of pseudo-server use is feasible in today's environment in which platform-independent languages such as Java are widely available.

Those skilled in the art will appreciate that the invention described herein can be implemented in software for any number of platforms or plafform-independent languages, and that coding techniques and methods may vary depending upon the particular platform and protocols applicable. Therefore, implementation of the invention is not limited to any one embodiment of software. As an example, however, the attached microfiche appendix which is incorporated herein by reference, provides exemplary code for the super-server and pseudo-server described herein, and is intended to be executed on a conventional computer or other programmed data processor. It will also be appreciated that a number of hardware elements used in networked systems are not shown or described herein, as they are known in the art, including data buses, system memory, input/output (I/O) adapters to which input devices such as a mouse and keyboard 612 are connected, display adapters to which a thin film transistor (TFT) or cathode ray tube (CRT) display is connected, removable media drives for receiving a floppy disk or other removable media, host adapters connected to fixed disks, CD-ROM drives for receiving a readable or read/write CD-ROM, or other mass storage device, video capture interfaces connected to image input devices such as CCD cameras, and network interfaces for providing a connection to a local network server through an Ethernet® connection or the like, or to a remote server through a telephone link or though the Internet. Those skilled in the art will appreciate that other devices and subsystems could be included, and that the devices and subsystems may be interconnected in various ways. It will further be appreciated that not all of these devices are necessary to practice the present invention, and that the present invention may be implemented on any conventional computer system under processor control. Additionally, it will be understood that the operable software or code for implementing the present invention may be stored in computer readable storage media such as system memory, removable media, fixed disks or CD-ROMs.

Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A system reducing congestion in a data transfer network, comprising:
   (a) a first computer having access to data files; and
   (b) a second computer having network and data storage resources;
   (c) wherein said first computer includes programming for carrying out the operations of giving said second computer access to requested data files available to said first computer in exchange for said second computer allocating to said first computer an amount of said network and storage resources available to said second computer.

2. A system as recited in claim 1, wherein the amount of said resources allocated to said first computer by said second computer is zero under "low-demand" conditions and wherein under said conditions said first computer functions as a concurrent server and said second computer functions as a client.

3. A system as recited in claim 1, wherein the amount of said resources allocated to said first computer by said second computer is non-zero under "high-demand" conditions and wherein under said conditions said first computer gives said second computer a list of referrals to where the requested data files may be obtained.

4. A system reducing congestion in a data transfer network, comprising:
   (a) a first computer having access to data files; and
   (b) a second computer having network and data storage resources;
   (c) wherein said first computer includes programming for carrying out the operations of giving said second computer faster access to requested data files available to said first computer in exchange for said second computer allocating to said first computer an amount of said network and storage resources available to said second computer;

(d) wherein the amount of said resources allocated to said first computer by said second computer is zero under "low-demand" conditions and wherein under said conditions said first computer functions as a concurrent server and said second computer functions as a client; and (e) wherein the amount of said resources allocated to said first computer by said second computer is non-zero under "high-demand" conditions and wherein under said conditions said first computer gives said second computer a list of referrals to where the requested data files may be obtained.

5. A method for reducing congestion in a data transfer network when a second computer requests access to data files available to a first computer, comprising the steps of giving said second computer access to said requested data files in exchange for said second computer allocating to said first computer network and storage resources available to said second computer.

6. A method as recited in claim 5, wherein the amount of said resources allocated to said first computer by said second computer is zero under "low-demand" conditions and wherein under said conditions said first computer functions as a concurrent server and said second computer functions as a client.

7. A method as recited in claim 5, wherein the amount of said resources allocated to said first computer by said second computer is non-zero under "high-demand" conditions and wherein under said conditions said first computer gives said second computer a list of referrals to where the requested data files may be obtained.

8. A method as recited in claim 7, wherein said list of referrals comprises an NG addressing mechanism which contains a network address and a geographic address whereby referrals are categorized by server proximity based on consideration of both network link topology and geographic proximity to the NG address provided by the pseudo-server making the request.

9. A method for reducing congestion in a data transfer network when a second computer requests access to data files on a first computer, comprising the steps of giving said second computer faster access to said requested data files in exchange for said second computer allocating to said first computer an amount of network and storage resources available to said second computer, wherein the amount of said resources allocated to said first computer by said second computer is zero under "low-demand" conditions and wherein under said conditions said first computer functions as a concurrent server and said second computer functions as a client, and wherein the amount of said resources allocated to said first computer by said second computer is non-zero under "high-demand" conditions and wherein under said conditions said first computer gives said second computer a list of referrals to where the requested data files may be obtained.

10. A method as recited in claim 9, wherein said list of referrals comprises an NG addressing mechanism which contains a network address and a geographic address whereby referrals are categorized by server proximity based on consideration of both network link topology and geographic proximity to the NG address provided by the pseudo-server making the request.

11. A method for cooperatively sharing the resource serving burden incumbent on a super-server within a network wherein resource requests are routed to said super-server through a pseudo-server, comprising the steps of:

(a) said pseudo-server making a request for a resource from a said super-server; said pseudo-server bidding its services in exchange for one or more resource access concessions by said super-server;

(b) said super-server granting access concessions in response to a bid from said pseudo-server, wherein a contract is formed as a function of said bid and said granted access concession;

(c) said pseudo-server receiving access to said resources substantially according to said access concessions; and (d) said pseudo-server substantially complying with said services bid.

12. A method as recited in claim 11, wherein said requested resources are selected from the group consisting of files, programs, data structures, tokens, and pointers.

13. A method as recited in claim 11, wherein said super-server provides said access concession for said requested resource in an indirect form by providing a referral list containing information on at least one other pseudo-server from which the resource can be retrieved.

14. A method as recited in claim 13, wherein said referral list comprises an NG addressing mechanism which contains a network address and a geographic address whereby referrals are categorized by server proximity based on consideration of both network link topology and geographic proximity to the NG address provided by the pseudo-server making the request.

15. A method as recited in claim 11, wherein said pseudo-server makes a bid for an access concession by requesting a referral to the resource from the super-server with said referral request containing a bid of services from said pseudo-server.

16. A method as recited in claim 11, wherein the services being offered within the bid by the pseudo-server constitute a guarantee that said pseudo-server will subsequently serve the resource, for which the access concessions have been sought, to subsequent resource requesters.

17. A method as recited in claim 11, wherein rejection of any said bid from said pseudo-server by said super-server is accompanied by a reason, and wherein if said reason constitutes an insufficiency of said bid, then said reason is accompanied by at least one specifying value to which it is estimated the bid must be raised in order to be accepted by the super-server.

18. A method as recited in claim 11, wherein said pseudo-server bid is for the temporary performance of the agreed upon services.

19. A method as recited in claim 11, wherein the service bid by said pseudo-server comprises a guarantee to serve the resource for which an access concession is sought to a number of subsequent requesters, up to a specified maximum, within a specified time interval.

20. A method as recited in claim 11, wherein a fulfillment breach by said pseudo-server of its accepted bid is recorded and used for subsequent qualification of said pseudo-server for resource access.

21. A method as recited in claim 20, wherein a record is kept of each pseudo-server generating an accusation of said fulfillment breach, whereby the information of said record provides a basis of sanctions against users generating unwarranted accusations.

22. A method as recited in claim 11, wherein said pseudo-server bids for resource access concessions and can submit successive bids until said access concession is granted by the super-server.

23. A method as recited in claim 20, wherein the process of said successive bidding constitutes a contract negotiation process wherein a series of bids can be met with suggestions and counteroffers.

24. A bandwidth allocation system for use between computers connected on a network that supports internet protocol, comprising:
  (a) one of said computers comprising a super-server from which resources can be requested, wherein serving said request requires network bandwidth;
  (b) one of said computers comprising a pseudo-server;
  (c) request processing programming associated with said super-server for carrying out the operations of receiving a bid from a pseudo-server requesting said resources and granting of the access request if said bid provides sufficient services in relation to the current level of super-server demand in relation to the policy as set forth by the administrator of the super-server;
  (d) bidding programming associated with said pseudo-server for carrying out the operations of offering an amount of pseudo-server services to said super-server in exchange for an access concession to a requested resource; and
  (e) service rendering programming associated with said pseudo-server for carrying out the operations of providing services as per said bid to other pseudo-servers;
  whereby the super-server provides resources to requesters in exchange for their acceptance of a portion of the bandwidth required to fulfill super-server resource requests which thereby reduces congestion on the network.

25. A system as recited in claim 24, wherein said request processing programming includes a contract negotiation process comprising responding to said receiving of bid with a super-server counteroffer that upon said granting is considered a contract between said pseudo-server and said super-server.

26. A system as recited in claim 24, wherein the super-server returns a reject message to the pseudo-server if the resource request from said pseudo-server is not granted and includes with that reject message a reason for the rejection, and furthermore if said reason constitutes an insufficiency of said bid, then said reason shall be accompanied by at least one specifying value to which it is estimated the bid must be raised in order to be accepted by the super-server.

27. A system as recited in claim 24, wherein fulfillment breaches by said pseudo-servers of accepted bids accepted by the super-server are recorded and used for qualification of cooperative pseudo-servers within the network by said super-servers.

28. A system as recited in claim 27, wherein a record is also kept of each pseudo-server that generates an accusation of said fulfillment breach, whereby the information of said record provides a basis of sanctions against users generating unwarranted fulfillment breach accusations.

* * * * *